United States Patent [19]

Sawamoto et al.

[11] Patent Number: 4,602,506
[45] Date of Patent: Jul. 29, 1986

[54] COMBUSTION PRESSURE SENSOR ARRANGEMENT

[75] Inventors: Kunifumi Sawamoto, Yokosuka; Hatsuo Nagaishi, Zushi, both of Japan; Kiyoshi Takeuchi, University Park, Pa.

[73] Assignee: Nissan Motor Co., Ltd., Yokohama, Japan

[21] Appl. No.: 749,100

[22] Filed: Jun. 26, 1985

[30] Foreign Application Priority Data

Jun. 29, 1984 [JP] Japan ................................ 59-134822
Jun. 29, 1984 [JP] Japan ................................ 59-134821

[51] Int. Cl.$^4$ ........................................... G01M 15/00
[52] U.S. Cl. .................................................. 73/115
[58] Field of Search ................. 73/115, 431, 756, 714, 73/754; 310/338, 340, 345

[56] References Cited

U.S. PATENT DOCUMENTS 2,773,388  12/1956  Prosser ................................ 73/431
3,505,862  4/1970  List et al. ............................ 73/115

Primary Examiner—Jerry W. Myracle
Attorney, Agent, or Firm—Schwartz, Jeffery, Schwaab, Mack, Blumenthal & Evans

[57] ABSTRACT

A guide sleeve is joined at an end thereof to the outer periphery of an annular pressure sensor and fits in an ignition plug accommodation hole. The pressure sensor is clamped between an ignition plug and a plug seating at the bottom of the ignition plug accommodation hole. The guide sleeve projects at the other end thereof from the ignition plug accommodation hole and mounts at the other end thereof an annular sealing member which has opposite axial ends brought into sealing contact with a cylinder head and a protective boot fitted on the ignition plug.

11 Claims, 10 Drawing Figures

COMBUSTION PRESSURE SENSOR ARRANGEMENT

BACKGROUND OF THE INVENTION

1. Field of the Invention

The present invention relates in general to internal combustion engines and more particularly to an arrangement of a pressure sensor for detecting the pressure of burned gases within a cylinder of an internal combustion engine.

2. Description of the Prior Art

For the purpose of improving the fuel consumption and output of an internal combustion engine, it is quite useful to know the actual combustion state of a mixture within a cylinder. For example, by feedback controlling an ignition timing in accordance with the combustion state of a mixture, an optimal fuel consumption and engine output can be attained through prevention of detonation.

As a measure for knowing such a combustion state, it has been commonly practiced to detect the pressure of burned gases within an engine cylinder, i.e. a combustion pressure. To this end, such a measure as shown in FIGS. 8 through 10 is known in the art.

Referring to the figures, the reference numeral 10 indicates a cylinder head having a threaded hole 11 into which an ignition plug 12 is screwed. Upon attachment of the ignition plug 12 into the threaded hole 11, an annular pressure sensor 15 is disposed between the ignition plug 12 and a plug seating 14 to be clamped therebetween.

The pressure sensor 15 has a laminated structure and includes an annular central electrode 16 at a central part thereof, a pair of annular piezoelectric elements 17 on the opposite sides of the central electrode 16, an upper electrode 18 and lower electrode 19 placed on the opposite outer surfaces of the piezoelectric elements 17 and a mold member 20 made of an electrically non-conductive material and covering the inner and outer peripheries of the electrodes and elements to join the same together.

The central electrode 16 has a lead-out portion extending through the mold member 20 to be electrically connected to a lead wire 21.

The pressure sensor 15 is adapted to serve as a washer for the ignition plug 12 and is held in a compressed state. The fastening force with which the ignition plug 12 is fastened to the cylinder head 10 varies as the ignition plug 12 is subjected to various combustion pressures within the cylinder, thus causing the voltage developed by the piezoelectric elements 17 to vary in accordance with variations of combustion pressure.

In the above manner, combustion pressures of the internal combustion engine can be accurately converted into electric signals to be measured.

A disadvantage of the above mentioned prior art arrangement is that there is a difficulty in bringing the lower electrode 19 into contact with the plug seating 14 perfectly or desirably. This is particularly true when the hole at the bottom of which the seating 14 is provided is deep.

Another disadvantage is that upon attachment of the ignition plug 12, the pressure 15 tends to rotate to damage the lead wire 21.

A further disadvantage is that upon removal of the ignition plug 12 the pressure sensor 15 is likely to be removed together with the ignition plug 12.

A yet further disadvantage is that the lead wire 21 tends to pick up ignition noise, causing a hindrance to accurate measurement of the combustion pressure.

SUMMARY OF THE INVENTION

In accordance with the present invention, there is provided a novel and improved combustion pressure sensor arrangement which comprises a guide sleeve joined at one end thereof to the outer periphery of an annular pressure sensor and fitted in an ignition plug accommodation hole. This structure is quite effective for overcoming the above noted disadvantages inherent in the prior art arrangement.

In accordance with the present invention, the combustion pressure sensor arrangement further comprises a sealing member fitted on the other end of the guide sleeve and having opposite axial ends brought into sealing contact with a protective boot and a cylinder head. This structure is quite effective for preventing intrusion of water, oil, etc. into the ignition plug accommodation hole and thereby preventing corrosion of the pressure sensor.

It is accordingly an object of the present invention to provide a novel and improved combustion pressure sensor arrangement in an internal combustion engine which makes it easier to locate a pressure sensor in place, i.e., to bring the pressure sensor into contact with a plug seating at the bottom of an ignition plug accommodation hole perfectly or desirably.

It is another object of the present invention to provide a novel and improved combustion pressure sensor arrangement of the above mentioned character which prevents the pressure sensor from being rotated to be damaged upon its installation.

It is a further object of the present invention to provide a novel and improved combustion pressure sensor arrangement of the above mentioned character which can prevent the pressure sensor from slipping off from the ignition plug accommodation hole upon removal of an ignition plug.

It is a further object of the present invention to provide a novel and improved combustion pressure sensor arrangement of the above mentioned character which is effective for preventing the lead wire of the pressure sensor from picking up ignition noise.

It is a further object of the present invention to provide a novel and improved combustion pressure sensor arrangement of the above mentioned character which can assuredly prevent intrusion of water, oil, etc. into the ignition plug accommodation hole and thereby elongate the life of the pressure sensor.

BRIEF DESCRIPTION OF THE DRAWINGS

The features and advantages of the combustion pressure sensor arrangement according to the present invention will become more clearly appreciated from the following description taken in conjunction with the accompanying drawings, in which like reference numerals designate like parts throughout the several views thereof and wherein.

DETAILED DESCRIPTION OF THE PREFERRED EMBODIMENTS

Figure 1:
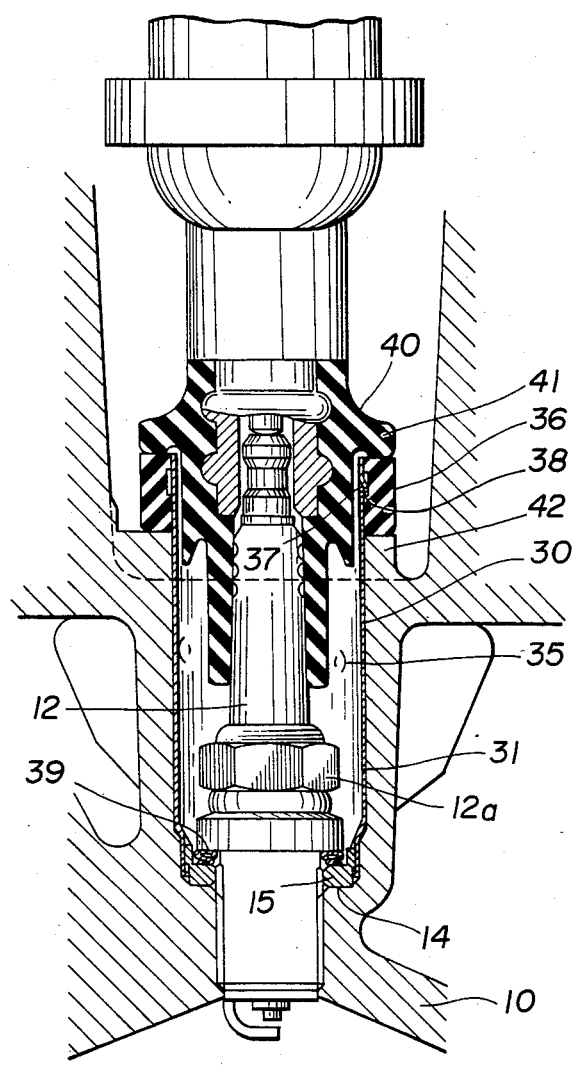
FIG. 1 is a sectional view of a combustion pressure sensor arrangement according to an embodiment of the present invention.
Figure 2:
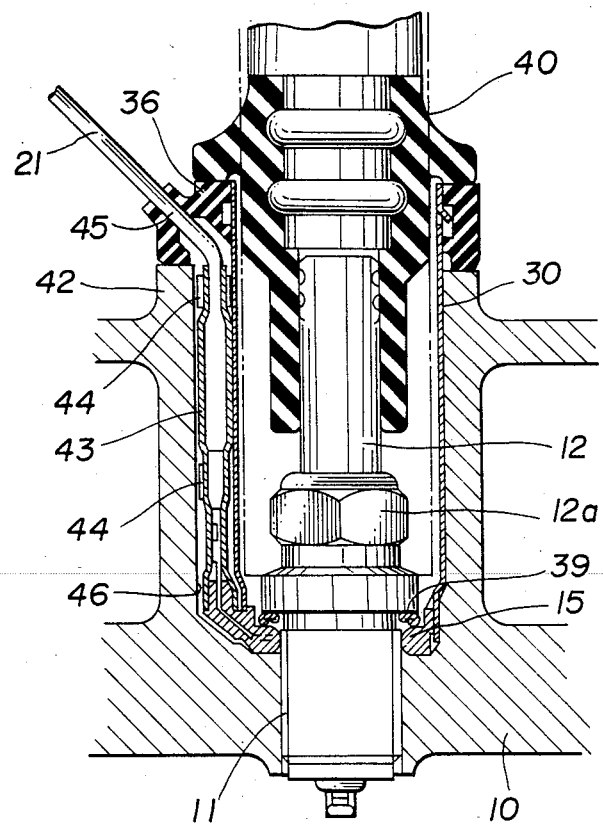
FIG. 2 is a view similar to FIG. 1 but along another sectional plane.
Figure 3:
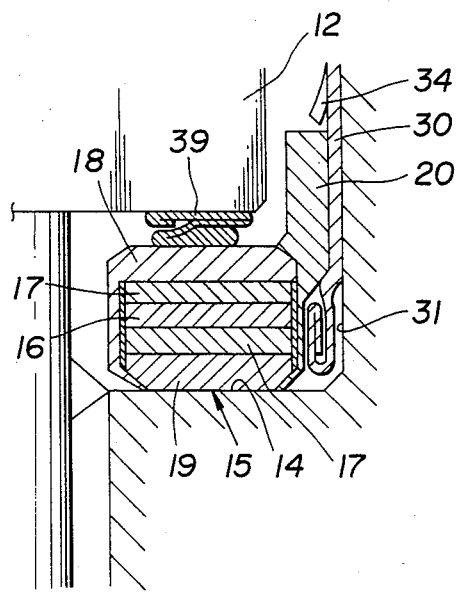
FIG. 3 is an enlarged sectional view of a pressure sensor and its associated parts of the arrangement of FIG. 1.
Figure 4:
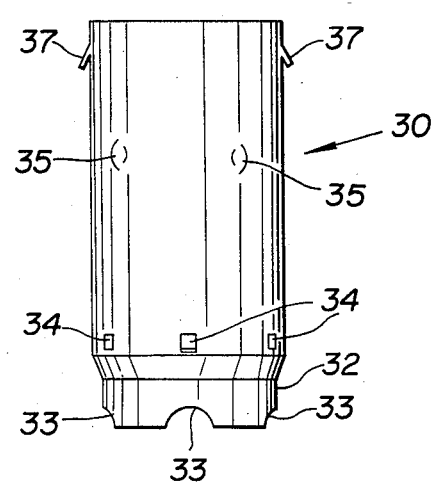
FIG. 4 is an elevational view of a guide sleeve of the arrangement of FIG. 1.

Referring to FIGS. 1 through 6, indicated by the reference numeral 30 is a guide sleeve fitted at the lower end thereof on the outer periphery of a pressure sensor 15. The guide sleeve 30 is formed from a sheet metal by pressing and inserted into an ignition plug accommodation hole 31 formed in a cylinder head 10.

More specifically, the guide sleeve 30 is generally cylindrical but stepped adjacent the lower end thereof to have a coaxial reduced diameter lower end portion 32 into which the pressure sensor 15 is inserted. The lower end portion 32 is formed with a plurality of crescent-shaped notches 33 for ease of insertion of the pressure sensor 15 thereinto. Adjacent the lower end portion 32, the guide sleeve 30 has a plurality of integral fingers 34 which are formed by cutting and bending in a manner to protrude inwardly thereof so that the fingers 34 are abuttingly engageable with the pressure sensor 15 to limit insertion thereof and hold the same axially in place. The guide sleeve 30 also has a plurality of projections 35 on the outer periphery thereof so that it fits in the ignition plug accommodation hole 31.

The guide sleeve has an upper end portion projecting from the ignition plug accommodation hole 31. On the outer periphery of the upper end portion of the guide sleeve 30 there is fitted an annular sealing member 36 which is made of a material having a good sealing characteristic such as rubber. The sealing member 36 has in the inner periphery thereof an annular groove 38 in which a plurality of fingers 37 of the guide sleeve 30 are put in a manner to limit axial movement of the sealing member 36 relative to the guide sleeve 30. The fingers 37 are located adjacent the upper end of the guide sleeve 30 and formed integrally thereto by cutting and bending in a manner to protrude outwardly of the guide sleeve 30.

The ignition plug 12 is inserted into the ignition plug accommodation hole 31 having fitted therein the guide sleeve 30 and screwed into a threaded hole 11 in such a manner that the pressure sensor 15 is clamped between a valve seating 14 and a flange 12a of the ignition plug 12. Between the flange 12a and the pressure sensor 15 an annular gasket 39 is interposed to provide a seal therebetween.

On the upper end portion of the ignition plug 12 there is fitted a plug boot 40 having an annular outward flange 41 brought into sealing contact with the upper end of the sealing member 36 throughout the circumference thereof. On the other hand, the lower end of the sealing member 36 is brought into sealing contact with an annular sealing member seating 42, which is formed in the cylinder head 10 and located at the upper end of the ignition plug accommodation hole 31, throughout the circumference thereof, thereby preventing intrusion of water, oil, etc. into the ignition plug 12 or to the inner and outer peripheries of the guide sleeve 30.

The pressure sensor 15 is basically of the conventional type and includes a protective tube 43 covering a lead wire 21 connected to a central electrode 16. The ignition plug accommodation hole 31 is generally circular and has an axial upstanding groove section 46 which is located outside of the guide sleeve 30 and in which the lead wire 21 and the protective tube 43 are disposed. The guide sleeve 30 has at the outer periphery thereof a pair of brackets 44 which are disposed in the groove section 46 and hold thereon the lead wire 21 and the protective tube 43. The sealing member 36 is partly enlarged in the radial direction thereof so as to close the upper end of the groove section 46 and has a hole 45 through which the lead wire 21 sealingly passes to project outwardly of the ignition plug accommodation hole 31.

From the foregoing, it is to be understood that since the pressure sensor 15 is adapted to fit at the outer periphery thereof in the guide sleeve 30, the lower end surface of the pressure sensor 15 is perpendicular to the axis of the guide sleeve 30. On the other hand, since the guide sleeve 30 is adapted to fit in the ignition plug accommodation hole 31, axes of the both are aligned with or parallel to each other. For this reason, simply inserting the guide sleeve 30 into the ignition plug accommodation hole 31 can assuredly and correctly bring the lower electrode 19 into contact with the plug seating 14. After the disposition of the guide sleeve 30, the ignition plug 12 is inserted into the ignition plug accommodation hole 31 and screwed into the threaded hole 11. In this connection, the pressure sensor 15 does not rotate since the guide sleeve 30 is fitted in the ignition plug accommodation hole 31 and prevented from rotation relative thereto.

It is further to be understood that upon installation of the plug boot 40 on the ignition plug 12, the flange portion 41 is brought into sealing contact with the upper end of the sealing member 36 which in turn is brought at its lower end into sealing contact with the seating 42, thereby preventing intrusion of water, oil, etc. into the ignition plug accommodation hole 31 and thereby assuredly preventing corrosion of the pressure sensor 15. In this connection, since the sealing member 36 is movable a little relative to the guide sleeve 30, the sealing member 36 can be assuredly brought into sealing contact with the seating 42 without being affected by dimensional errors.

It is still further to be understood that accurate measurement of combustion pressure can be taken by the arrangement of the present invention since the guide sleeve 30 serves as a kind of insulation member for preventing the lead wire 21 from being affected by ignition noise.

Figure 7:
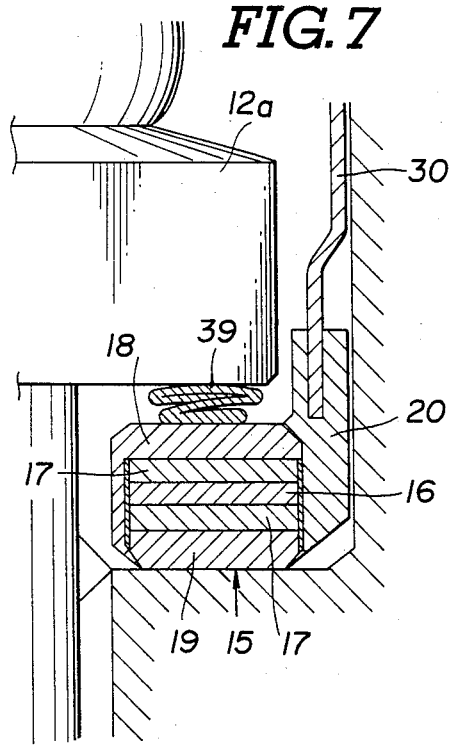
FIG. 7 is a view similar to FIG. 3 but showing another embodiment of the present invention.
Figure 5:
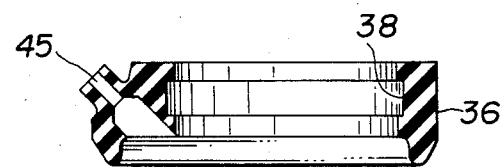
FIG. 5 is an enlarged sectional view of a sealing member of the arrangement of FIG. 1.
Figure 6:
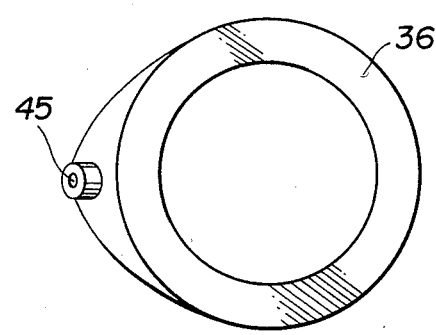
FIG. 6 is a plan view of the sealing member of FIG. 5.
Figure 8:
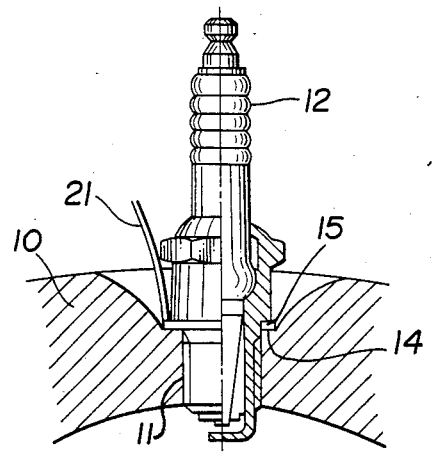
FIG. 8 is a sectional view of a prior art combustion pressure sensor arrangement.
Figure 9:
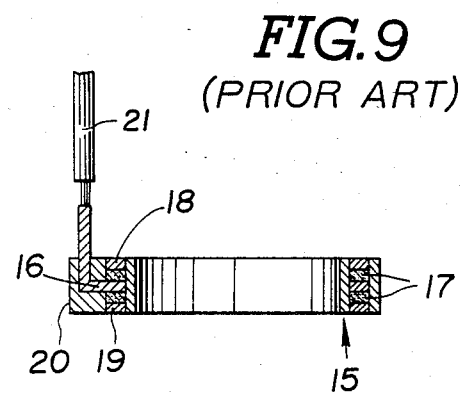
FIG. 9 is an enlarged sectional view of a pressure sensor of the arrangement of FIG. 8.
Figure 10:
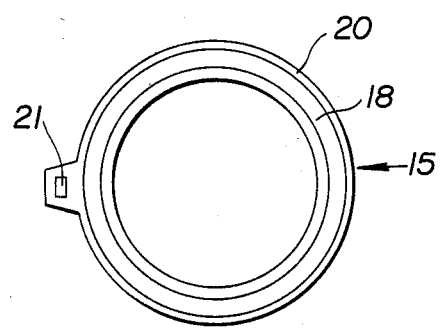
FIG. 10 is a plan view of the pressure sensor of FIG. 9.

Referring to FIG. 7, another embodiment of the present invention will now be described. This embodiment differs from the previous embodiment in that the lower end of the guide sleeve 30 is embeded into the mold member 20 in a manner to be integrally joined with same upon molding. By this, the pressure sensor 15 and the guide sleeve 30 are assuredly joined together and prevented from being separated from each other, resulting in that treatment thereof becomes easier. To the same end, the pressure sensor 15 and the guide sleeve 30 in the previous embodiment may be bonded together after assembly or the mold member 20 and the guide sleeve 30 are joined by spot-welding. In this instance, it is however necessary to electrically insulate the mold member 20 relative to the central electrode 16 and the piezoelectric member 17. The omitted part of the second embodiment is similar to the previous embodiment.

What is claimed is:

1. A combustion pressure sensor arrangement in an internal combustion engine having a cylinder head, comprising:
    a plug seating formed in the cylinder head;
    an annular pressure sensor;
    an ignition plug screwed into the cylinder head in such a manner that said pressure sensor is clamped between said ignition plug and said plug seating;
    an ignition plug accommodation hole formed in the cylinder head for accommodating therein said ignition plug; and
    a guide sleeve joined at one end thereof to the outer periphery of said pressure sensor and fitted in said ignition plug accommodation hole, wherein said one end of said guide sleeve is fitted on the outer periphery of said pressure sensor.

2. A combustion pressure sensor arrangement as set forth in claim 1, wherein said one end of said guide sleeve is bonded to the outer periphery of said pressure sensor.

3. A combustion pressure sensor arrangement as set forth in claim 1, wherein said one end of said guide sleeve is welded to the outer periphery of said pressure sensor.

4. A combustion pressure sensor arrangement as set forth in claim 1, wherein said ignition plug accommodation hole is generally circular and has a groove section extending axially thereof and located outside of said guide sleeve, said pressure sensor having a lead wire covered by a protective tube and passing through said groove section toward the outside of said ignition plug accommodation hole.

5. A combustion pressure sensor arrangement as set forth in claim 4, wherein said guide sleeve has at the outer periphery thereof a bracket disposed in said groove section and holding thereon said lead wire.

6. A combustion pressure sensor arrangement as set forth in claim 1, wherein said guide sleeve projects at the other end thereof from said ignition plug accommodation hole.

7. A combustion pressure sensor arrangement as set forth in claim 6, further comprising a protective boot fitted on said ignition plug and an annular sealing member fitted on said other end of said guide sleeve and having opposite axial ends brought into sealing contact with said protective boot and the cylinder head.

8. A combustion pressure sensor arrangement as set forth in claim 7, wherein said sealing member is limitedly movable on said guide sleeve.

9. A combustion pressure sensor arrangement as set forth in claim 8, further comprising a sealing member seating formed in the cylinder head, said sealing member seating and said plug seating being respectively located at the opposite axial ends of said ignition plug accommodation hole, one of said ends of said sealing member being in sealing contact with said sealing member seating, said protective boot having an outer peripheral flange with which the other end of said sealing member is brought into sealing contact.

10. A combustion pressure sensor arrangement in an internal combustion engine having a cylinder head, comprising:
    a plug seating formed in the cylinder head;
    an annular pressure sensor;
    an ignition plug screwed into the cylinder head in such a manner that said pressure sensor is clamped between said ignition plug and said plug seating;
    an ignition plug accommodation hole formed in the cylinder head for accommodating therein said ignition plug; and
    a guide sleeve joined at one end thereof to the outer periphery of said pressure sensor and fitted in said ignition plug accommodation hole, wherein said pressure sensor has an outer peripheral portion formed by molding, said one end of said guide sleeve being embedded in said outer peripheral portion upon said molding.

11. A combustion pressure sensor arrangement in an internal combustion engine having a cylinder head, comprising:
    a plug seating formed in the cylinder head;
    an annular pressure sensor;
    an ignition plug screwed into the cylinder head in such a manner that said pressure sensor is clamped between said ignition plug and said plug seating;
    an ignition plug accommodation hole formed in the cylinder head for accommodating therein said ignition plug; and
    a guide sleeve joined at one end thereof to the outer periphery of said pressure sensor and fitted in said ignition plug accommodation hole.

* * * * *